United States Patent
Le Roux et al.

(10) Patent No.: US 9,679,559 B2
(45) Date of Patent: Jun. 13, 2017

(54) SOURCE SIGNAL SEPARATION BY DISCRIMINATIVELY-TRAINED NON-NEGATIVE MATRIX FACTORIZATION

(71) Applicant: Mitsubishi Electric Research Laboratories, Inc., Cambridge, MA (US)

(72) Inventors: Jonathan Le Roux, Somerville, MA (US); John R. Hershey, Winchester, MA (US); Felix Weninger, Bavaria (DE); Shinji Watanabe, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/290,205

(22) Filed: May 29, 2014

(65) Prior Publication Data
US 2015/0348537 A1    Dec. 3, 2015

(51) Int. Cl.
*G10L 15/20* (2006.01)
*G10L 21/0272* (2013.01)
*G10L 21/0232* (2013.01)
*G10L 15/06* (2013.01)

(52) U.S. Cl.
CPC ............ *G10L 15/063* (2013.01); *G10L 15/20* (2013.01); *G10L 21/0272* (2013.01); *G10L 21/0232* (2013.01)

(58) Field of Classification Search
CPC .. G10L 15/142; G10L 21/028; G10L 21/0208
USPC .......................... 704/233, 236, 240
See application file for complete search history.

(56) References Cited

U.S. PATENT DOCUMENTS

| | | | |
|---|---|---|---|
| 2010/0174389 A1* | 7/2010 | Blouet | G10L 21/028 700/94 |
| 2012/0143604 A1 | 6/2012 | Singh | |
| 2012/0191640 A1* | 7/2012 | Ebadollahi | G06N 99/005 706/53 |

(Continued)

FOREIGN PATENT DOCUMENTS

WO     20090124861 A1    10/2009

OTHER PUBLICATIONS

E.M. Grais and H. Erdogan, "Discriminative nonnegative dictionary learning using cross-coherence penalties for single channel source separation," in Proc. of INTERSPEECH, Lyon, France, 2013.

(Continued)

*Primary Examiner* — Huyen Vo
*Assistant Examiner* — Rodrigo Chavez
(74) *Attorney, Agent, or Firm* — Gene Vinokur; James McAleenan; Hironori Tsukamoto

(57) ABSTRACT

A method estimates source signals from a mixture of source signals by first training an analysis model and a reconstruction model using training data. The analysis model is applied to the mixture of source signals to obtain an analysis representation of the mixture of source signals, and the reconstruction model is applied to the analysis representation to obtain an estimate of the source signals, wherein the analysis model utilizes an analysis linear basis representation, and the reconstruction model utilizes a reconstruction linear basis representation.

7 Claims, 1 Drawing Sheet

(56) References Cited

U.S. PATENT DOCUMENTS

| | | | | |
|---|---|---|---|---|
| 2013/0132077 A1* | 5/2013 | Mysore | ............... | G10L 21/028 704/233 |
| 2013/0132082 A1* | 5/2013 | Smaragdis | ............ | G10L 15/142 704/240 |
| 2014/0358534 A1* | 12/2014 | Sun | .................... | G10L 21/0208 704/233 |
| 2015/0242180 A1* | 8/2015 | Boulanger-Lewandowski | | G06N 3/0445 700/94 |

OTHER PUBLICATIONS

Z. Wang and F. Sha, "Discriminative non-negative matrix factorization for single-channel speech separation," in Proc. of ICASSP, Florence, Italy, 2014.

F. Weninger, C. Kirst, B. Schuller, and H.J. Bungartz, "A discriminative approach to polyphonic piano note transcription using supervised non-negative matrix factorization," in Proc. of ICASSP, Vancouver, Canada, 2013, pp. 6-10.

Pablo Sprechmann, Alex M. Bronstein, and Guillermo Sapiro, "Supervised non-Euclidean sparse NMF via bilevel optimization with applications to speech enhancement," in Proc. HSCMA, May 2014.

Baby Deepak et al: 11 Coupled dictionary 1-8 training for exemplar-based speech enhancement 2014 IEEE International Conference on Acoustics~0 Speech and Signal Processing (ICASSP)~ IEEE May 4, 2014 (May 4, 2014)~ pp. 2883-2887 XP032617387 DOI: 10.1109/ICASSP.2014.6854127 [retrieved on Jul. 11, 2014] p. 2883~ paragraph 1.—p. 2884 paragraph 3.1; figure 1.

Tom Barker et al: "Non-negative Tensor Factorisation of Modulation Spectrograms for Monaural Sound Source Separation", INTERSPEECH 2813, Aug. 25, 2813 (2813-88-25), pp. 827-831, XP855288912, Lyon, France Retrieved from the Internet: URL:http://www.inspire-itn.eujadministrato rjcomponentsjcomjresearch/filesjpublicationsjBarker2813.pdf [retrieved on 2815-87-88] p. 827, paragraph 1 p. 828, paragraph 3—p. 829, paragraph 4.

Paul D 01Grady et al: "Discovering Convolutive Speech Phones Using Sparseness and Non-negativity", Sep. 9, 2887 (2887-89-89), Independent Component Analysis and Signal Separation; [Lecture Notes in Computer Science], Springer Berlin Heidelberg, Berlin, Heidelberg, p. (S) 528-527, XP819888856, ISBN: 978-3-548-74493-1 p. 528, paragraph 1—p. 525, paragraph 5.

* cited by examiner

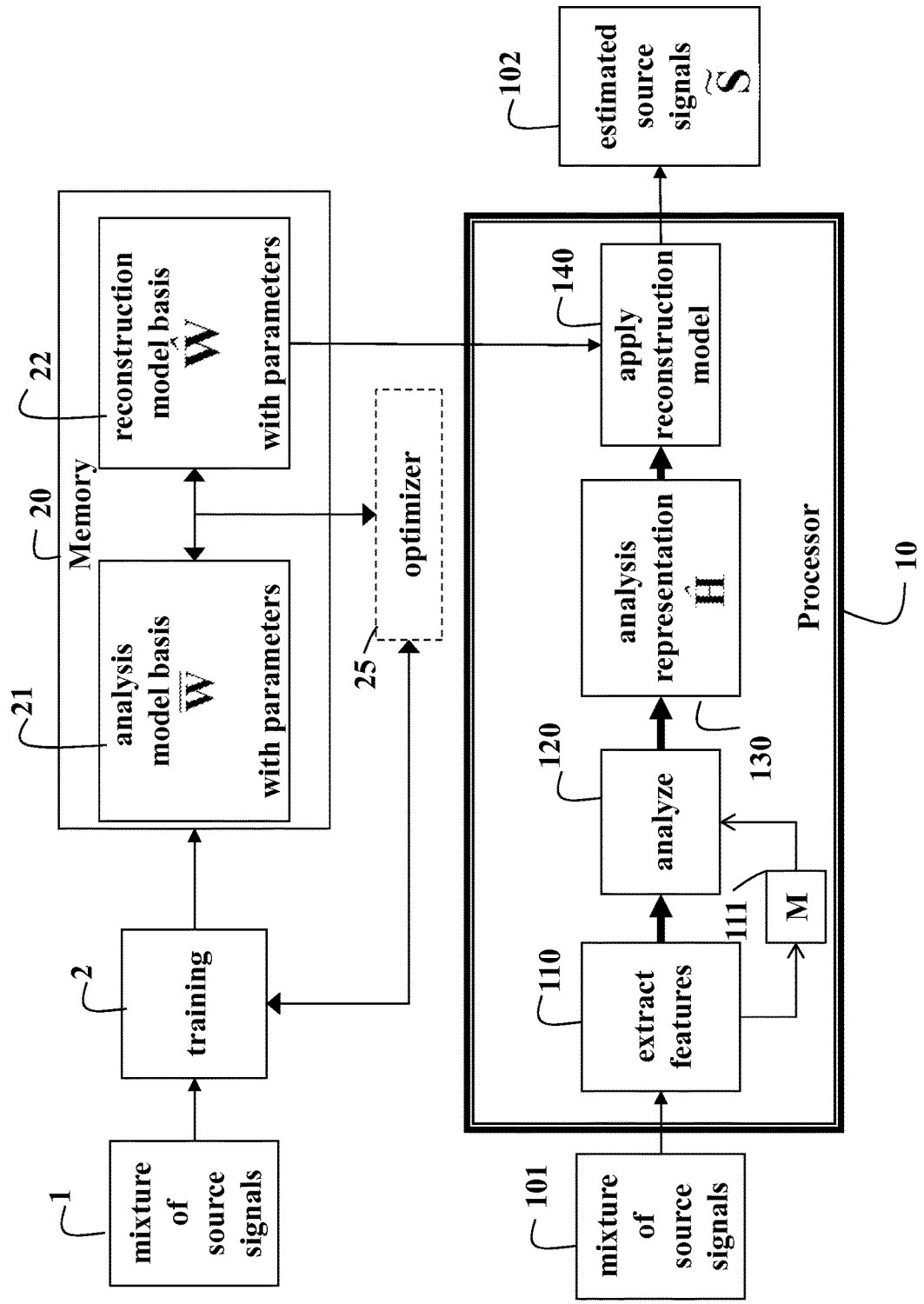

SOURCE SIGNAL SEPARATION BY DISCRIMINATIVELY-TRAINED NON-NEGATIVE MATRIX FACTORIZATION

FIELD OF THE INVENTION

This invention relates generally to signal processing, and more particularly to separating source signals from a mixture of source signals.

BACKGROUND OF THE INVENTION

Non-negative matrix factorization (NMF) is commonly used for challenging single-channel audio source separation tasks, such as speech enhancement in the presence of non-stationary noises. In this context, the idea is to represent features of the source signals as sets of basis functions and their activation coefficients, one set per source signal. Mixtures of the source signals are then analyzed using the concatenated sets of basis functions, and each source signal is reconstructed using its corresponding activation coefficients and the set of basis functions.

NMF operates on a matrix of F-dimensional non-negative spectral features, usually a power or magnitude spectrogram of the mixture, $M=[m_1 \ldots m_T]$, where T is the number of frames and $m_t \in \mathfrak{R}_+^F$, $t=1, \ldots, T$ are obtained by short-time Fourier analysis of the time-domain signal.

For the general case of separating S sources, a set of $R_l$ non-negative basis vectors $w_1^l, \ldots, w_{R_l}^l$ is assumed for each source $l \in \{1, \ldots, S\}$, and concatenated into matrices $W^l=[w_1^l \ldots w_{R_l}^l]$. From this, a factorization $$M \approx WH = [W^1 \ldots W^S][H^1; \ldots; H^S] \quad (1)$$

is obtained, where we use the notation $[a;b]=[a^T b^T]^T$ and $a^T$ denotes the transpose of a.

An approach related to Wiener filtering is typically used to reconstruct each source, while ensuring that the source estimates sum to the mixture:

$$\hat{S}^l = \frac{W^l H^l}{\sum_l W^l H^l} \otimes M, \quad (2)$$

where $\otimes$ denotes element-wise multiplication and the quotient line element-wise division. $W^l$ can be determined in advance from training data, and at run time only the activation matrices $H^l=[h_1^l \ldots h_T^l]$, where $h_t^l \in \mathfrak{R}_+^{R_l}$, are estimated. This is called supervised NMF. In the supervised case, the activations for each frame are independent from the other frames ($m_t \approx \Sigma_l W^l h_t^l$). Thus, source separation can be performed on-line and with latency corresponding to the window length plus the computation time to obtain the activations for one frame.

Another operating mode for NMF-based source separation is semi-supervised NMF, in which the $W^l$ for only some of the sources $l \in L_{trained}$ are determined in advance from training data, and at run time both the basis matrices $W^l$ for other sources $l \notin L_{trained}$, and the activation matrices $H^l$ for all sources ($l \in L_{trained}$ and $l \notin L_{trained}$) are estimated.

At test time, supervised NMF determines the optimal activations H such that $$\hat{H} = [\hat{H}^1; \ldots; \hat{H}^S] = \underset{H}{\mathrm{argmin}} D(M \mid WH) + \mu |H|_1, \quad (3)$$

where D is a cost function that is minimized when $M=WH$. For example, typical choices for D include the β-divergence $D_\beta$, which for $\beta=1$, yields the generalized Kullback-Liebler (KL) divergence, and for $\beta=2$, yields the Euclidean distance. An $L_1$ sparsity constraint with weight µ p is added to favor solutions where few basis vectors are active at a time. A convenient procedure for minimizing equation (3) that preserves non-negativity of H by multiplicative updates is given by iterating $$H^{(q+1)} = H^{(q)} \otimes \frac{W^T(M \otimes (\Lambda^{(q)})^{\beta-2})}{W^T(\Lambda^{(q)})^{\beta-2} + \mu}, \quad 0 \le q < Q$$

until convergence, with $\Lambda^{(q)}:=WH^{(q)}$, where the superscripts (q) and (q+1) indicate iterates, and $Q \ge 1$ gives the maximum number of iterations. $H^0$ is initialized randomly.

Because sources often have similar characteristics in the short-term observations (such as unvoiced phonemes and broadband noise, or voiced phonemes and music), it is beneficial to use information from multiple time frames. This can be performed by stacking features: the observation $m'_t$ at time t corresponds to the observations $[m_{t-T_L}; \ldots; m_t; \ldots; m_{t-T_R}]$ where $T_L$ and $T_R$ are the left and right context sizes. Analogously, each basis element $w'^l_k$ models a sequence of spectra, stacked into a column vector. For readability, the ' is subsequently dropped.

Obtaining NMF Bases

A common approach to obtain bases $W^l$ that fit an NMF model $W^l H^l$ to the spectrograms of source signals $S^l$ is by minimizing a reconstruction objective $D_\beta(S^l|W^l H^l)$. To learn overcomplete bases, one can use sparse NMF (SNMF), performing the minimization $$\overline{W}^l, \overline{H}^l \leftarrow \underset{W^l, H^l}{\mathrm{argmin}} D_\beta(S^l \mid \tilde{W}^l H^l) + \mu |H^l|_1 \quad (4)$$

for each l, where $$\tilde{W}^l = \left[ \frac{w_1^l}{\|w_1^l\|} \ldots \frac{w_{R_l}^l}{\|w_{R_l}^l\|} \right]$$

is the column-wise normalized version of $W^l$.

Because the L1 sparsity constraint on H is not scale-invariant, the constraint by itself can be minimized by scaling the factors. By including the normalization on $W^l$ in the cost function, the scale indeterminacy can be avoided. This is not the same as performing conventional NMF optimization and scaling one of the factors to unit norm after each iteration, which is often the way sparsity is implemented in NMF, and which is denoted hereafter by NMF+S. A multiplicative update procedure can be used to optimize equation (4) for arbitrary $\beta \ge 0$.

As an alternative to sparse NMF training, exemplar-based approaches, where every basis function corresponds to an observation of the source l in the training data, are often used in practice for large-scale factorizations of audio signals.

Discriminative Approach to NMF

In the model underlying the above source separation process, separately trained source models are concatenated to yield a model of the mixture. This comes with the benefit of modularity. Models of different sources can be substituted for one another without having to train the whole system. However, this type of model also has a fundamental flaw. The objectives in equation (3) and (4) used at test and training time are considerably different. The test-time inference objective (3) operates on a mixture while the training objective (4) operates on separated sources.

If there is spectral overlap in the bases of the different sources, which cannot be avoided in the general case, such as for speech/noise separation, the activations obtained using equation (3) are different than those obtained using equation (4). It is clear that (4) cannot be used at test time, because $S^l$ is unknown. Hence, a discriminative approach can take into account the objective function from equation (3) at training time.

This involves having mixtures M, along with their ground truth separated sources $S^i$ available for parallel training. However, supervised NMF also assumes the availability of separated training signals for all sources, and assumes simple linear mixing of the sources at test time. Generating the mixtures from the training signals for parallel training requires no additional assumptions.

The following optimization problem is for training bases as discriminative NMF (DNMF):

$$\tilde{W} = \underset{W}{\operatorname{argmin}} \sum_{l} \gamma_l D_\beta(S^l \mid W^l \hat{H}^l(M, W)), \quad (5)$$

where $$\hat{H}(M, \overline{W}) = \underset{H}{\operatorname{argmin}} D_\beta(M \mid \tilde{W}H) + \mu|H|_1, \quad (6)$$

and $\gamma_l$ are weights accounting for the application-dependent importance of the source l. For example, in speech denoising, The focus is on reconstructing the speech signal, and the weight corresponding to the speech source can be set to 1 while the other weights are set to 0.

Equation (5) minimizes the reconstruction error given $\hat{H}$. Equation (6) ensures that $\hat{H}$ are the activations that arise from the test-time inference objective. Note that, in equation (5), W does not need normalization. Given the bases W, the activations $\hat{H}(M, W)$ are uniquely determined, due to the convexity of equation (6).

SUMMARY OF THE INVENTION

The objective of single-channel speech separation is to estimate source signals from a mixture of source signals. The mixture of source signals can include, e.g., any type of acoustic signal, such as speech, music, and noise. We are particularly interested in a mixture of signals that include speech and noise, and to estimate the speech. Non-negative matrix factorization (NMF) is one approach for this task.

The discriminative NMF approach described above is a solution to the problem of mismatch between the objective functions used at training and test time. However, that approach relies on solving a difficult bi-level optimization problem, because the same bases are used for analysis of the mixture and reconstruction of each source.

To avoid the difficulty of bi-level optimization, the embodiments of the invention provide a more general model, called generalized discriminative NMF, in which, in addition to the basis functions used for analysis with the conventional NMF, a second set of reconstruction basis functions is used. The embodiments also provide a multiplicative update procedure to estimate the reconstruction basis functions.

Contributions of the invention include a novel objective function and optimization methods for training the model. The method discriminatively trains the set of reconstruction basis functions to minimize the error in estimating the reconstruction of one or more sources, where the activations are obtained from the mixture signal using the set of analysis basis functions.

BRIEF DESCRIPTION OF THE DRAWINGS

The FIGURE is a flow diagram of a method for separating source signals from a mixture of source signals according to embodiments of the invention.

DETAILED DESCRIPTION OF THE PREFERRED EMBODIMENTS

As shown in FIG. 1, the embodiments of the invention provide a method for estimating source signals 102 from a mixture of source signals 101. In one embodiment, the mixture of source signals includes acoustic signals and noise. It should be understood that the invention can be worked with acoustic signals such as speech and music.

The FIGURE shows a processor 10 connected to a memory 20. The memory stores an analysis model ($\overline{W}$) 21 and a reconstruction model ($\hat{W}$) 22. The analysis model and the reconstruction model are trained 2 on training data 1. Parameters of the models can be learned, and optimized 25 during training to minimize an estimation error of the set of source signals using, e.g., a beta convergence. The parameters can be constrained to be identical.

The method performed in the processor 10 takes a mixture of source signals 101 as input. For example, the mixture of source signal includes speech and noise. However, it should be understood that the method can also be applied to other types of mixed signals such as music and ultrasound.

Features M 111 of the mixed signal are extracted 110. For example, in some embodiments, each feature vector in the mixture, source, and estimated source spectrograms, as well as basis vectors, covers nine consecutive frames ($T_l=8$, $T_r=0$) obtained by short-time Fourier transformation, using 25 ms window size, 10 ms window shift, and a square root of a Hann window. Because no information from the future is used ($T_r=0$), the features $m_t$ can be extracted on-line. In analogy to the features in M, each column of $\hat{S}^t$, representing the feature estimates of the source signals, corresponds to a sliding window of consecutive reconstructed frames. To fulfill the real-time constraint, only the last frame in each sliding window is used to reconstruct the output signal. It is understood, that other features can be used.

The features are analyzed 120 using the analysis model to obtain an analysis representation 130 of the mixture of source signals in the form of an activation matrix $\hat{H}$. Then, the reconstruction model is applied 140 to the analysis representation to obtain an estimate 102 of the mixture of source signals.

The generalized DNMF model can be formulated using the following objective functions, including two basis sets, the analysis bases $\overline{W}$ 21, and the reconstruction bases $\hat{W}$ 22:

$$\tilde{W} = \underset{W}{\operatorname{argmin}} \sum_{l} \gamma_l D_\beta(S^l \mid W^l \hat{H}^l(M, \overline{W})), \quad (7)$$

where $$\hat{H}(M, \overline{W}) = \underset{H}{\operatorname{argmin}} D_\beta(M \mid \overline{W}H) + \mu|H|_1, \quad (8)$$

This generalized DNMF problem, in its full generality, is still bi-level, but it gives us the option of holding $\overline{W}$ constant to alleviate the difficulty, because $\hat{W}$ can then be obtained using conventional NMF updates.

Optimizing both W and $\overline{W}$ jointly using equation (7) can be performed using gradient descent methods and algorithmic differentiation methods. In the preferred embodiments, we procede with a method, in which $\overline{W}$ is trained separately on each source using equation (4), and we use the shorthand notation $\hat{H}=H(M, \overline{W})$.

Optimizing Bases for Wiener Filtering and SNR

As an additional benefit, we can extend the optimization to the Wiener-filter reconstruction in equation (2), yielding the optimization of a new training objective:

$$\hat{W} = \underset{W}{\operatorname{argmin}} \sum_l \gamma_l D_\beta \left( S^l \middle| \frac{W^l \hat{H}^l}{W \hat{H}} \otimes M \right) \quad (9)$$

At test time, the source estimates $\hat{S}$ for a mixture M are reconstructed using equation (2) with W, and the activation matrices $\hat{H}(M,\overline{W})$.

This framework also allows us to optimize the bases to improve the signal-to-noise ratio (SNR) in the case where features are magnitude spectra. Indeed, minimizing the Euclidean distance $D_2^l := D_2(S^l|\hat{S}^l)$ between the magnitude spectrum of the source l, $S^l$, and that of its reconstruction, $\hat{S}^l$, directly corresponds to maximizing the SNR, neglecting the difference between noisy and oracle phases. Thus, we optimize for an upper-bound of the actual SNR. Training W using equation (9) with $\beta=2$ amounts to optimizing the bases for maximum SNR. Note that this does not mean that the activations $\hat{H}(M,\overline{W})$ used in (9) necessarily have to be obtained with the same setting $\beta=2$ in equation (8), as long as the same $\beta$ is used at training time and test time. In fact, the best results in our experiments are obtained by using $\beta=1$ in (8) and $\beta=2$ in (9). This might be due to the KL divergence being better suited to decomposing mixtures.

Multiplicative Update Procedures for Generalized Discriminative NMF with Wiener Filtering We now describe a multiplicative update procedure to minimize the objective in equation (9) with respect to W for fixed H, where our goal is to reconstruct a single source $l \in \{1, \ldots, S\}$. We set $\gamma_l=1$, $\gamma_{l':l' \neq l}=0$, and define $\Lambda = \Sigma_l W^l H^l$, $\Lambda^l = W^l H^l$ for $l \in \{1, \ldots, S\}$, $\Lambda^{\bar{l}} = \Lambda - \Lambda^l$, and $\hat{S}^l = \Lambda^l/\Lambda \otimes M$.

KL Objective with Wiener Filtering (DNMF-W-KL)

For the case where $\beta=1$ (KL), the objective function in (9) becomes $$D_1^l := D_1(S^l | \hat{S}^l) = \sum_{i,j} S_{i,j}^l \log \frac{S_{i,j}^l}{M_{i,j}\frac{\Lambda_{i,j}^l}{\Lambda_{i,j}}} + M_{i,j} \frac{\Lambda_{i,j}^l}{\Lambda_{i,j}} - S_{i,j}^l.$$

The partial derivative of $D_1^l$ with respect to the i-th element of the k-th basis function of the desired source, $w_{i,k}^l$, is $$\frac{\partial D_1^l}{\partial w_{i,k}^l} = \sum_j S_{i,j}^l \left( \frac{h_{k,j}^l}{\Lambda_{i,j}} - \frac{h_{k,j}^l}{\Lambda_{i,j}^l} \right) + M_{i,j} \frac{h_{k,j}^l \Lambda_{i,j} - \Lambda_{i,j}^l h_{k,j}^l}{\Lambda_{i,j}^2} \quad (10)$$

$$= \sum_j -\frac{S_{i,j}^l \Lambda_{i,j}^{\bar{l}}}{\Lambda_{i,j} \Lambda_{i,j}^l} h_{k,j}^l + \frac{M_{i,j} \Lambda_{i,j}^{\bar{l}}}{\Lambda_{i,j}^2} h_{k,j}^l,$$

where we use in the second equality that, by definition, $\Lambda_{i,j} - \Lambda_{i,j}^l = \Lambda_{i,j}^{\bar{l}}$. Similarly, we obtain $$\frac{\partial D_1^l}{\partial w_{i,k}^{l'}} = \sum_j \frac{S_{i,j}^l}{\Lambda_{i,j}} h_{k,j}^{l'} - \frac{M_{i,j} \Lambda_{i,j}^l}{\Lambda_{i,j}^2} h_{k,j}^{l'} \quad (11)$$

for any $l' \neq l$. Because all matrix elements are non-negative, we can derive multiplicative update rules by splitting equations (10) and (11) into positive and negative parts, and dividing the negative part by the positive part, leading to:

$$W^l \leftarrow W^l \otimes \frac{\frac{S^l \otimes \Lambda^{\bar{l}}}{\Lambda \otimes \Lambda^l} H^{lT}}{\frac{M \otimes \Lambda^{\bar{l}}}{\Lambda^2} H^{lT}}$$

$$W^{\bar{l}} \leftarrow W^{\bar{l}} \otimes \frac{\frac{M \otimes \Lambda^l}{\Lambda^2} H^{\bar{l}T}}{\frac{S^l}{\Lambda} H^{\bar{l}T}}$$

where $$W^{\bar{l}} := [W_1 \ldots W^{l-1} W^{l+1} \ldots W^S],$$

i.e., the bases of all sources except l, and $H^{\bar{l}}$ is defined accordingly. The general case of $\gamma_l \geq 0$ for all l can be easily obtained from the above computations due to the linearity of the gradient.

LS Objective with Wiener Filtering (DNMF-W-LS)

For the case where $\beta=2$ (LS: least-squares), the gradient of $D_2^l$ leads to:

$$W^l \leftarrow W^l \otimes \frac{\frac{M \otimes S^l \otimes \Lambda^{\bar{l}}}{\Lambda^2} H^{lT}}{\frac{M^2 \otimes \Lambda^{\bar{l}} \otimes \Lambda^l}{\Lambda^3} H^{lT}}, \text{ and}$$

$$W^{\bar{l}} \leftarrow W^{\bar{l}} \otimes \frac{\frac{M^2 \otimes (\Lambda^l)^2}{\Lambda^3} H^{\bar{l}T}}{\frac{M \otimes S^l \otimes \Lambda^l}{\Lambda^2} H^{\bar{l}T}}.$$

The extension to general $\gamma_l$ is again straightforward.

Effect of the Invention

The embodiments of the invention provide a discriminative approach for training NMF reconstruction bases that provide the best reconstruction for the source (i.e., minimize a divergence to the true source) given the activations obtained on a mixture in conventional supervised NMF, yielding significant performance gains in a speech and noise separation task. Our invention can also be used for semi-supervised NMF, but for simplicity of presentation, we focused on the supervised NMF case. The method is able to yield good performance even with sub-optimal analysis bases, such as bases trained with very low or very high sparsity, because the reconstruction bases are trained to minimize error given the analysis bases, and can thus recover to some extent from inaccuracies in the analysis bases. This indicates that our method can yield significant gains in cases where sparse NMF is not an appropriate model due to an assumed presence of multiple basis vectors, such as notes of different pitches in the case of musical source separation.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for obtaining output source signal estimates from a mixture of source signals, comprising steps of:
   acquiring, by a processor, the mixture of source signals as input, wherein the mixture of source signals includes acoustic signals;
   using, by the processor, an estimation procedure on the mixture of source signals to obtain the output source signal estimates, wherein the estimation procedure comprises:
      applying an analysis model to the mixture of source signals to obtain an analysis representation of the mixture of source signals;
      applying a reconstruction model to the analysis representation to obtain the output source signal estimates,
      wherein the analysis model utilizes an analysis linear basis representation, and the reconstruction model utilizes a reconstruction linear basis representation, and
      wherein the analysis model and the reconstruction model are trained on training data using a training procedure, the training procedure including:
         training the analysis model using analysis training data, wherein the analysis training data includes training source signals;
         training the reconstruction model using reconstruction training data, wherein the reconstruction training data includes reconstruction training source signals and the corresponding reconstruction training mixtures, wherein the training of the reconstruction model includes:
            applying the estimation procedure to the corresponding reconstruction training mixtures to obtain reconstruction training source signal estimates;
            optimizing the reconstruction model to minimize an error between the reconstruction training source signal estimates and the reconstruction training source signals;
   outputting the output source signal estimates so as to provide performance gains in an acoustic signal separation analysis.

2. The method of claim 1, wherein the linear representations include non-negative basis functions and non-negative coefficients.

3. The method of claim 1, wherein the applying includes a Wiener filtering step.

4. The method of claim 1, wherein the acoustic signals include speech.

5. The method of claim 1, wherein the error uses a beta divergence.

6. The method of claim 1, wherein the reconstruction model for one source is applied to the analysis representations of all sources.

7. A method for obtaining output source signal estimates from a mixture of source signals, comprising steps of:
   acquiring, by a processor, the mixture of source signals as input, wherein the mixture of source signals includes noise and speech;
   using, by the processor, an estimation procedure to the mixture of source signals to obtain the output source signal estimates, wherein the estimation procedure comprises:
      applying an analysis model to the mixture of source signals to obtain an analysis representation of the mixture of source signals;
      applying a reconstruction model to the analysis representation to obtain the output source signal estimates,
      wherein the analysis model utilizes an analysis linear basis representation, and the reconstruction model utilizes a reconstruction linear basis representation, and
      wherein the analysis model and the reconstruction model are trained on training data using a training procedure, the training procedure including:
         training the analysis model using analysis training data, wherein the analysis training data includes training source signals;
         training the reconstruction model using reconstruction training data, wherein the reconstruction training data includes reconstruction training source signals and the corresponding reconstruction training mixtures, wherein the training of the reconstruction model includes:
            applying the estimation procedure to the corresponding reconstruction training mixtures to obtain reconstruction training source signal estimates;
            optimizing the reconstruction model to minimize an error between the reconstruction training source signal estimates and the reconstruction training source signals;
   outputting the output source signal estimates so as to provide performance gains in a speech and a noise separation analysis, and wherein the steps are performed in the processor.

* * * * *